United States Patent [19]
Murai

[11] Patent Number: 5,239,679
[45] Date of Patent: Aug. 24, 1993

[54] RADIO TELECOMMUNICATION APPARATUS CAPABLE OF STORING RECEIVED MESSAGES AND ERASING THE MESSAGES AT PROGRAMMABLE INTERVALS

[75] Inventor: Makoto Murai, Tokyo, Japan

[73] Assignee: Kabushiki Kaisha Toshiba, Kawasaki, Japan

[21] Appl. No.: 606,157

[22] Filed: Oct. 31, 1990

[30] Foreign Application Priority Data

Nov. 2, 1989 [JP] Japan .................................. 1-284975

[51] Int. Cl.⁵ ............................................. H04B 1/16
[52] U.S. Cl. ................................ 455/38.1; 340/311.1; 340/825.44; 379/61; 455/181.1
[58] Field of Search .................... 455/31, 38, 181, 185, 455/186, 228, 343, 31.1, 38.1, 38.4, 181.1, 185.1, 186.1; 340/311.1, 825.44, 825.48, 825.5, 825.22; 375/57, 58, 61

[56] References Cited

U.S. PATENT DOCUMENTS

| 4,851,829 | 7/1989 | DeLuca et al. ................ 340/825.44 |
| 4,872,005 | 10/1989 | DeLuca et al. ................ 340/825.44 |
| 4,894,649 | 1/1990 | Davis ............................. 340/825.44 |
| 4,949,085 | 8/1990 | Fisch et al. .................... 340/825.44 |
| 5,040,204 | 8/1991 | Sasaki et al. ........................ 379/61 |

FOREIGN PATENT DOCUMENTS 1-5472 2/1989 Japan .

Primary Examiner—Reinhard J. Eisenzopf
Assistant Examiner—Chi Pham
Attorney, Agent, or Firm—Oblon, Spivak, McClelland, Maier & Neustadt

[57] ABSTRACT

A radio telecommunication apparatus comprising a memory circuit for storing a message received, a timer circuit, an input section, and a message-erasing circuit. The input section is operated to set a timing of erasing the message stored in the memory circuit. When the time measured by the timer circuit becomes identical to the message-erasing timing set by operating the input section, the message-erasing circuit automatically erases the message stored in said memory circuit.

16 Claims, 11 Drawing Sheets

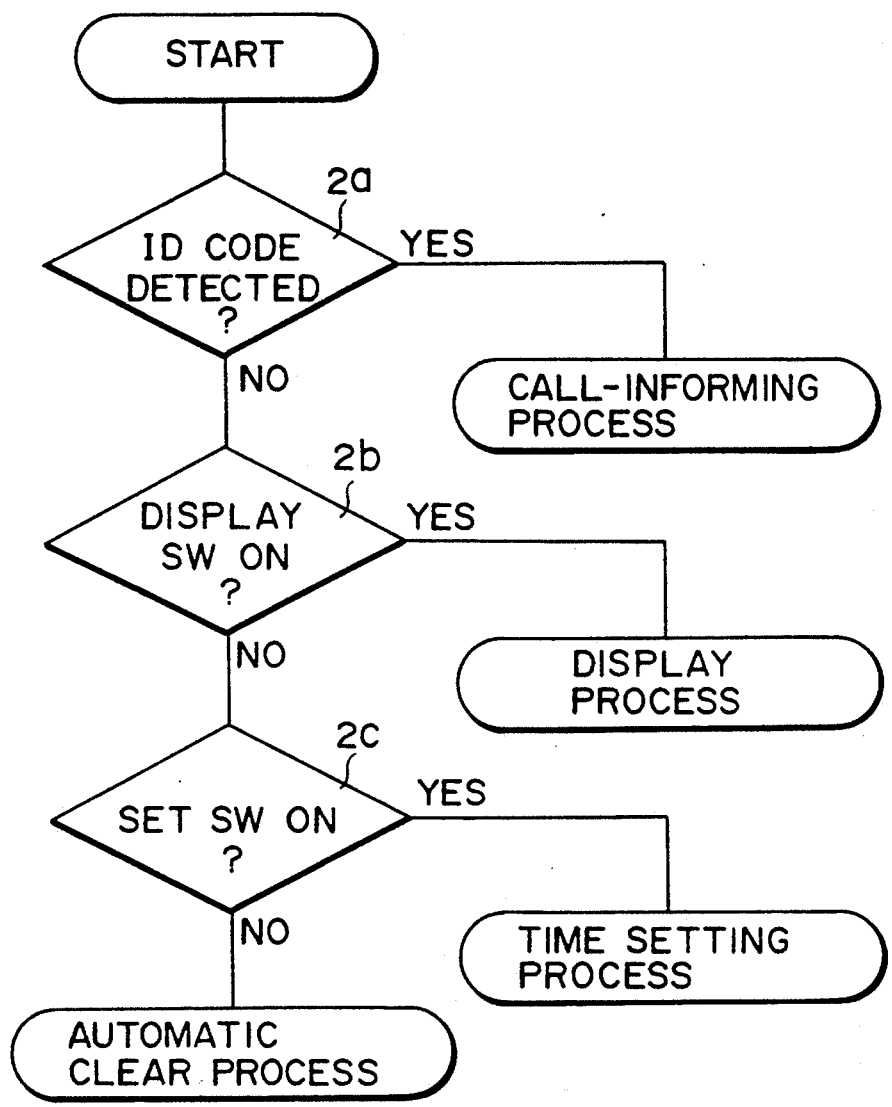
F I G. 2

RADIO TELECOMMUNICATION APPARATUS CAPABLE OF STORING RECEIVED MESSAGES AND ERASING THE MESSAGES AT PROGRAMMABLE INTERVALS

BACKGROUND OF THE INVENTION

1. Field of the Invention

The present invention relates to a radio telecommunication apparatus such as a pager receiver, a mobile telephone, a cordless telephone, or the like, and more particularly to a radio telecommunication apparatus which can store messages it has received.

2. Description of the Related Art

In recent years a new type of a paging system has been developed, in which pager receivers display the messages transmitted from a base station. A paging signal used in this system is formed as follows. That is, one frame is time-divided into a plurality of groups each of which is time-divided into a synchronization word and a plurality of calling words. In each calling word are inserted an identification (ID) code and a message code.

In order to call one of the pager receivers which belongs to the paging system, a caller dials a telephone number assigned to the pager receiver, thereby calling the base station. Then, the caller transmits message data to the base station through the telephone line. Upon receipt of the telephone number and the message data, the base station generates an ID code from the telephone number and also a message code from the message data. The ID code is one assigned to the pager receiver which is being called. The ID code and the message code are inserted into a paging signal. More precisely, they are inserted into a vacant word of the group to which the pager receiver belongs. The paging signal containing the ID code and the message code is transmitted from the base station.

The pager receiver comprises an antenna, a radio circuit, a demodulation circuit, a control circuit, an ID code memory, a message memory, a drive circuit, a speaker, a liquid-crystal display (LCD), an LCD-driving circuit, a display switch, and a stop switch.

The antenna catches the paging signal transmitted from the base station. The paging signal is supplied via the radio circuit to the demodulation circuit, which demodulates the received paging signal. The demodulated signal is input to the control circuit. The control circuit compares the ID code contained in the paging signal, with the self-ID code stored in the memory. If the ID code is identical to the self-ID code, the control circuit outputs a ringing signal. The ringing signal is supplied via the drive circuit to the speaker. The speaker generates a ringing tone from the ringing signal. Hearing the ringing tone, the person having the pager receiver (hereinafter called "pager holder") knows that someone is calling him or her.

Upon the occurrence of a coincidence between the ID codes, the control circuit enters the message code received following the ID code. After being subjected to an error correcting process, the message code is decoded and the decoded message data is applied to a display driving circuit. Consequently the message is displayed on a liquid crystal display (LCD by the display driving circuit. Therefore, the pager holder can understand the message from the caller through the liquid crystal display at the time of generation of the call. The LCD stops displaying the message when the pager holder operates the stop switch or when a predetermined period of time elapses.

Meanwhile the message code is transferred from the control circuit to the message memory and is stored therein. The message code is read from the message memory and supplied to the control circuit, whenever the pager holder operates the display switch after the LCD has stopped displaying the message. Hence, the message can be displayed again.

Thus, every time the pager receiver receives a pager signal containing an ID code identical to the self-ID code, the LCD automatically displays the message represented by the message code inserted in the paging signal, and the message memory stores the message.

The message memory has a memory area large enough for storing six message codes at most. When the pager receiver receives a seventh message code, the first message code is erased from the message memory, whereby the seventh message code is stored into the message memory. Hence, as long as the pager receiver is used in ordinary conditions, the message memory always stores the latest six message codes the pager receiver has received.

The conventional pager receiver described above is disadvantageous in the following respect. At most six message codes are kept stored in the message memory up until the pager receiver receives a seventh message code. Therefore, if the pager receiver receives no message codes for several days or several weeks, the six message code stored in the message memory are several weeks or several days old. When the pager receiver receives a new message code very similar to, for example, the second oldest message code stored in the message memory, and the LCD displays the new message along with the old five messages, the pager holder may take the now oldest message for the new message.

SUMMARY OF THE INVENTION

An object of the present invention is to provide a radio telecommunication apparatus in which any message stored in a memory is automatically erased in a specific scheme, thereby making it easy for a user to distinguish one message from another, and any message stored in the memory can be erased by manual operation.

Another object of this invention is to provide a radio telecommunication apparatus in which any selected one of the messages stored in a memory can be automatically erased.

A still further object of the invention is to provide a radio telecommunication apparatus which has a memory for storing a plurality of messages and with which a user can easily and accurately set a timing of erasing any selected one of the messages stored in the memory.

Further, another object of the present invention is to provide a radio telecommunication apparatus in which any necessary message can be preserved in a memory, no matter how old it is.

Still another object of the present invention is to provide a radio telecommunication apparatus which a user can easily and accurately use to designate a message which is to be preserved in, or to be erased from, a memory.

Further, another object of this invention is to provide a radio telecommunication apparatus with which a user can set a timing of erasing a message from a memory, designate a message to be preserved in, or erased from, the memory, by operating the same switch, and which has a small number of switches and is hence small and light.

To achieve the objects described above, according to a first aspect of the invention, there is provided a radio telecommunication apparatus comprising: a receiving circuit for receiving a signal containing a message; a memory circuit having a storage area for storing at least one message contained in a signal output by the receiving circuit; a timer circuit for measuring time and for outputting time data; a first input section; and a first message-erasing circuit. The first input section receives and holds the message-erasing data representing the timing of erasing the message stored in the memory circuit. The first message-erasing circuit erases the message stored in the memory circuit in accordance with the time data output by the timer circuit and also with the message-erasing data supplied to the first input section.

The message received and stored in the memory circuit is automatically erased upon lapse of a predetermined time set to the timer circuit or upon lapse of a predetermined time after the data is stored into the memory circuit. Hence, no old messages will remain in the memory circuit, and it will be easy for the holder of the device to distinguish a new message from an old one.

According to a second aspect of the present invention, there is provided a radio telecommunication apparatus identical to the device according to the first aspect of the invention, except that it further comprises a second input section and a second message-erasing circuit. The second input section is operated, thereby inputting a command for erasing a selected one of the messages stored in the memory circuit. In response to this command, the second message-erasing circuit erases the selected message from the memory circuit. Hence, the holder of the device can erase any received message which should not be disclosed to anyone else, before the message is automatically erased from the memory circuit.

According to a third aspect of the invention, there is provided a radio telecommunication apparatus identical to the device according to the first aspect, except for two points. First, it comprises a second input section for inputting data representing the timings of erasing the messages stored in the memory circuit. Second, the message-erasing circuit erases messages from the memory circuit in accordance with the time data output by the timer circuit and also with the message-erasing timing data input by operating the second input section. With this device it is possible to erase the messages sequentially in the order they have been received, or in ascending order of importance.

According to a fourth aspect of the invention, there is provided a radio telecommunication apparatus identical to the device according to the third aspect, except that it further comprises a display and a display control circuit. The display control circuit reads the messages from the memory circuit and causes the display to display the messages, before the second input circuit is operated to set and hold message-erasing data items representing timings of erasing the messages stored in the memory circuit. Hence, immediately after the holder of the device operates the second input section, thus inputting the timing of erasing any message from the message circuit, he or she can see the massage on the display and confirm which message he or she is going to erase.

According to a fifth aspect of the present invention, there is provided a radio telecommunication apparatus which comprises a receiving circuit, a memory circuit, a timer circuit, a message-erasing circuit, a first input section, and a second input section. The first input section is operated to input data representing the timings of erasing the messages stored in the memory circuit. The second input section is operated to input and hold data about those of the messages stored in the memory circuit which are to be preserved. The message-erasing circuit erases messages from the memory circuit in accordance with the time data output by the timer circuit, message-erasing timing data input by operating the second input section, and the message-preserving data held in the second input and held by said second input section. With this device it is possible to preserve any of the received messages as long as is desired, merely by operating the second input section, thereby designating the message as one that should not be automatically erased and should be preserved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2, FIGS. 3A and 3B, FIGS. 4 to 6, FIGS. 7A and 7B, and FIG. 8 are flow charts explaining how the control circuit incorporated in the pager receiver operates to perform various controls.

DETAILED DESCRIPTION OF THE PREFERRED EMBODIMENTS

First Embodiment

A first embodiment of the invention, which is a pager receiver, will first be described, with reference to the block diagram of FIG. 1.

Figure 1:
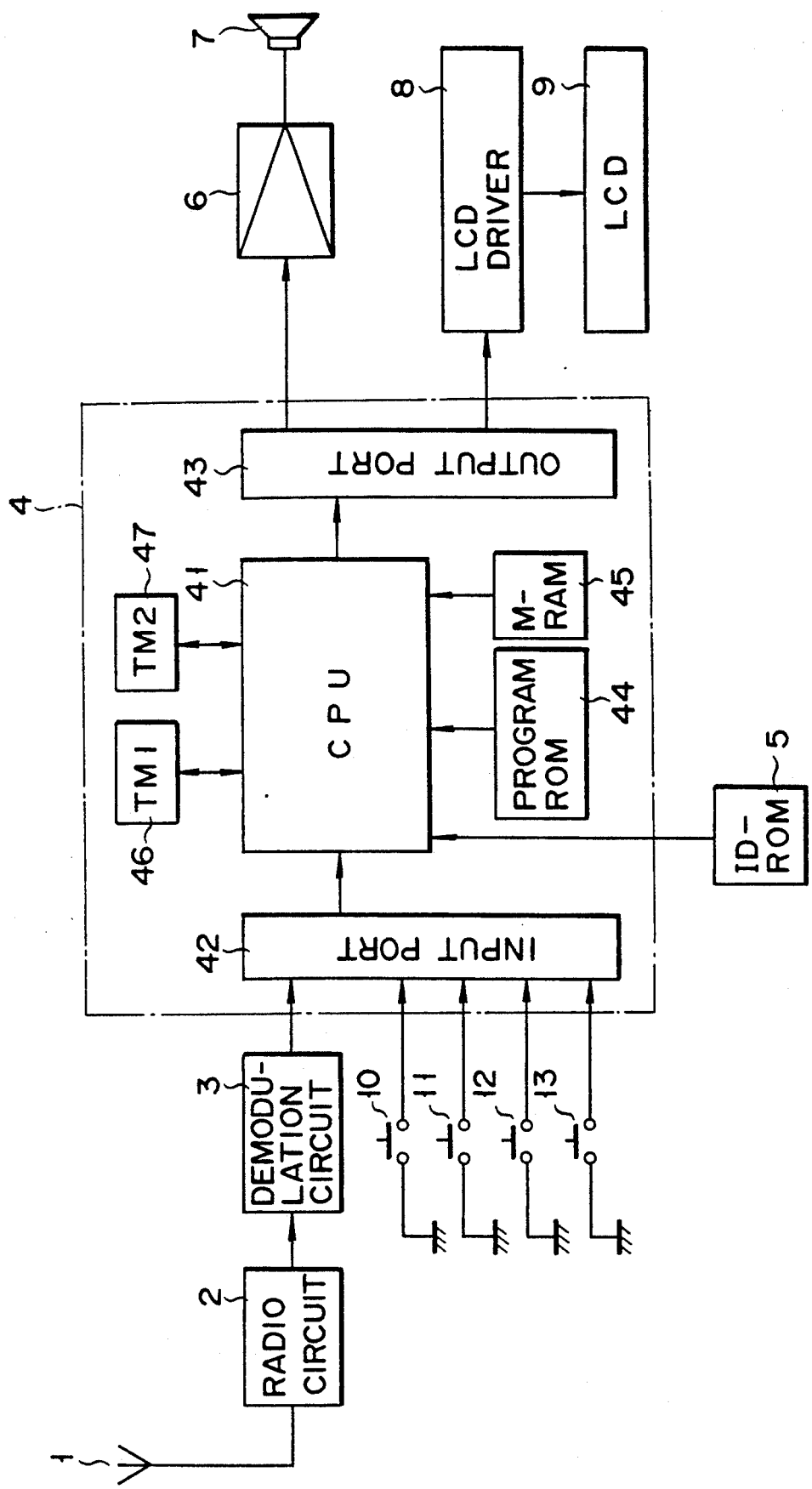
FIG. 1 is a block diagram showing a pager receiver which is a first embodiment of the present invention.

As FIG. 1 shows, the pager receiver comprises an antenna 1, a radio circuit 2, a demodulation circuit 3, a control circuit 4, an ID ROM 5, a speaker driver 6, a speaker 7, an LCD driver 8, an LCD 9, a display switch 10, a control switch 11, a time-setting switch 12, and an increment switch 13.

The control circuit 4 is, for example, a microcomputer, and has a central processing unit (CPU) 41, an input port 42, an output port 43, a program ROM 44, a message memory (M-RAM) 45, a first timer (TM1) 46, and a second timer (TM2) 47. The CPU 41 performs predetermined controls in accordance with the programs stored in the program ROM 44. The ID ROM 5 is connected to the CPU 41. The ID ROM 5 stores the prescribed ID code assigned to the pager receiver.

The demodulation circuit 3, the display switch 10, the control switch 11, the time-setting switch 12, and the increment switch 13 are connected to the input port 42. The switches 10 to 13 are push-button switches. The display switch 10 is depressed in order to display the message stored in the message memory 45, by means of the LCD 9. The control switch 11 is pushed in order to preserve or clear the message stored in the message memory 45. The time-setting switch 12 is operated to set the current date and the present time to the first timer 46. The increment switch 13 is operated to set the time of automatically erasing the received message stored in the message memory 45.

The speaker driver 6 and the LCD driver 8 are connected to the output port 43. The speaker driver 6 generates a ringing signal upon receipt of a drive signal supplied from the CPU 41 through the output port 43. The ringing signal is supplied to the speaker 7, which generates a ringing tone. The LCD driver 9 drives the LCD 9 in accordance with message data supplied from the CPU 41 via the output port 43. Driven by the driver 9, the LCD 9 displays the message represented by the message data.

The message memory 45 is a RAM and has a memory area for storing, for example, six messages received from a base station (not shown). The first timer 46 comprises an IC for use in a watch and is designed to measure time in the ordinary way. By contrast, the second timer 47 is, for example, a programmable counter. This counter starts operating upon receipt of a count-starting signal supplied from the CPU 41, and generates a time-over signal the moment its count reaches the value preset by the CPU 41.

The operation of the pager receiver described above will now be explained with reference to the flow charts of FIG. 2, FIGS. 3A and 3B, FIGS. 4 to 6, FIGS. 7A and 7B, and FIG. 8.

As long as the power switch (not shown) of the pager receiver remains on, the antenna 1 receives the paging signal transmitted from a base station (not shown). The paging signal is supplied via the radio circuit 2 to the demodulation circuit 3, which demodulates the received paging pager signal. The demodulated signal is input to the control circuit 4.

In the control circuit 3, the CPU 41 repeats steps 2a, 2b, and 2c sequentially, as is shown in FIG. 2. In step 2a, the CPU 41 determines whether or not the ID code contained in the paging signal is identical to the IC code stored in the ID ROM 5. In step 2b, the CPU 41 determines whether or not the display switch 10 has been pushed In step 2c, the CPU 41 determines whether or not the time-setting switch 12 has been depressed.

Figure 3A:
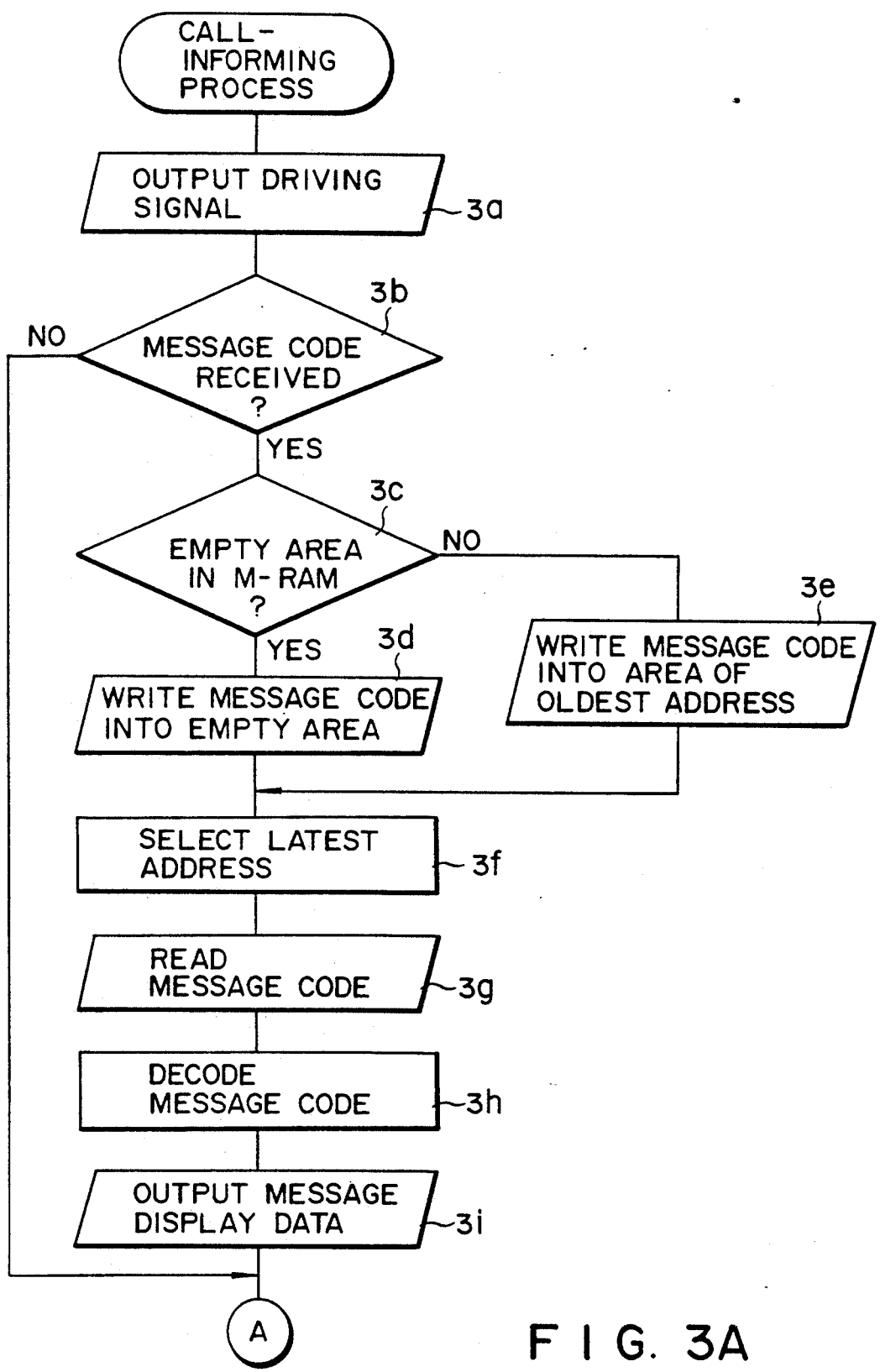

If YES in step 2a, the CPU 41 determines that the pager receiver is being called, and hence starts performing a call-informing process. More specifically, as is shown in FIG. 3A, the CPU 41 supplies a driving signal to the speaker driver 6 in step 3a. Upon receipt of the driving signal, the speaker driver 6 drives the speaker 7, which generates a ringing tone. Hearing this tone, the person who holds the pager receiver (hereinafter referred to as "pager holder") knows that he or she is being called. In step 3b, the CPU 41 determines whether or not a message code has been received. If YES, the operation goes to step 3c, in which the CPU 41 determines whether or not the memory area of the message memory 45 includes at least one empty location. If YES in step 3c, the message code is written at the empty location in step 3d. If NO in step 3c, the flow goes to step 3e, in which the oldest message code is erased from a memory location in the message memory 45, thus rendering that location empty, and the latest message code received is written at that location.

After the latest message code has been written into the message memory 45 in step 3d or 3e, the CPU 41 starts display control in order cause the LCD 9 to display the message code received. To be more specific, in step 3f, the CPU 41 selects the address of the memory location where the latest message code is stored. Then, in step 3g, this memory location is accessed, whereby the message code is read from the location. In step 3h, the CPU 41 decodes the message mode into message data. In step 3i, the message data is supplied to the LCD driver 8 from the CPU 41 through the output port 43, whereby the LCD 9 displays the latest message received. Hence, the pager holder can see the message transmitted from the caller by way of the base station.

Figure 3B:
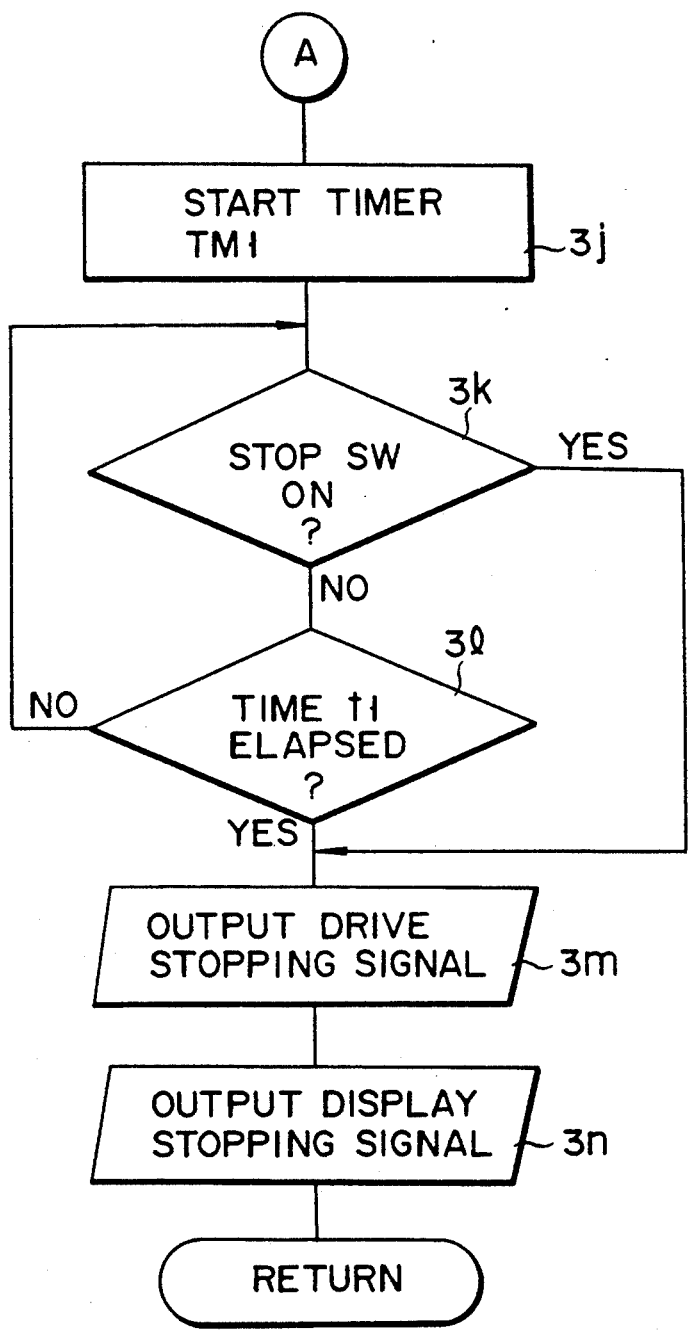

After the speaker 7 and the LCD 9 have started generating the ringing tone and displaying the message, the CPU 41 starts a control for stopping the generating of the ringing tone and the displaying of the message. More precisely, as is shown in FIG. 3B, the CPU 41 supplies a count-start signal to the second timer 47, in step 3j, whereby the timer 47 starts measuring time. In step 3k, the CPU 41 determines whether or not the stop switch (not shown) has been depressed. If NO, the flow goes to step 3l, in which the CPU 41 determines whether or not a period of time t1 has elapsed and the second timer 47 has generated a time-over signal. Assuming the pager holder pushes the stop switch in this condition, the CPU 41 supplies a stop signal to the speaker driver 6 in step 3m. In this case, the CPU 41 supplies a stop signal to the LCD driver 8 in step 3n. As a result, the speaker 7 stops generating the ringing tone, and the LCD 9 stops displaying the message. Even if the pager holder has not depressed the stop switch, the second timer 47 generates a time-over signal upon lapse of the period t1 (e.g., 10 seconds). If this is the case, the CPU 41 performs steps 3m and 3n, whereby the speaker 7 automatically stops generating the ringing tone, and the LCD 9 automatically stops displaying the latest message received.

Figure 4:
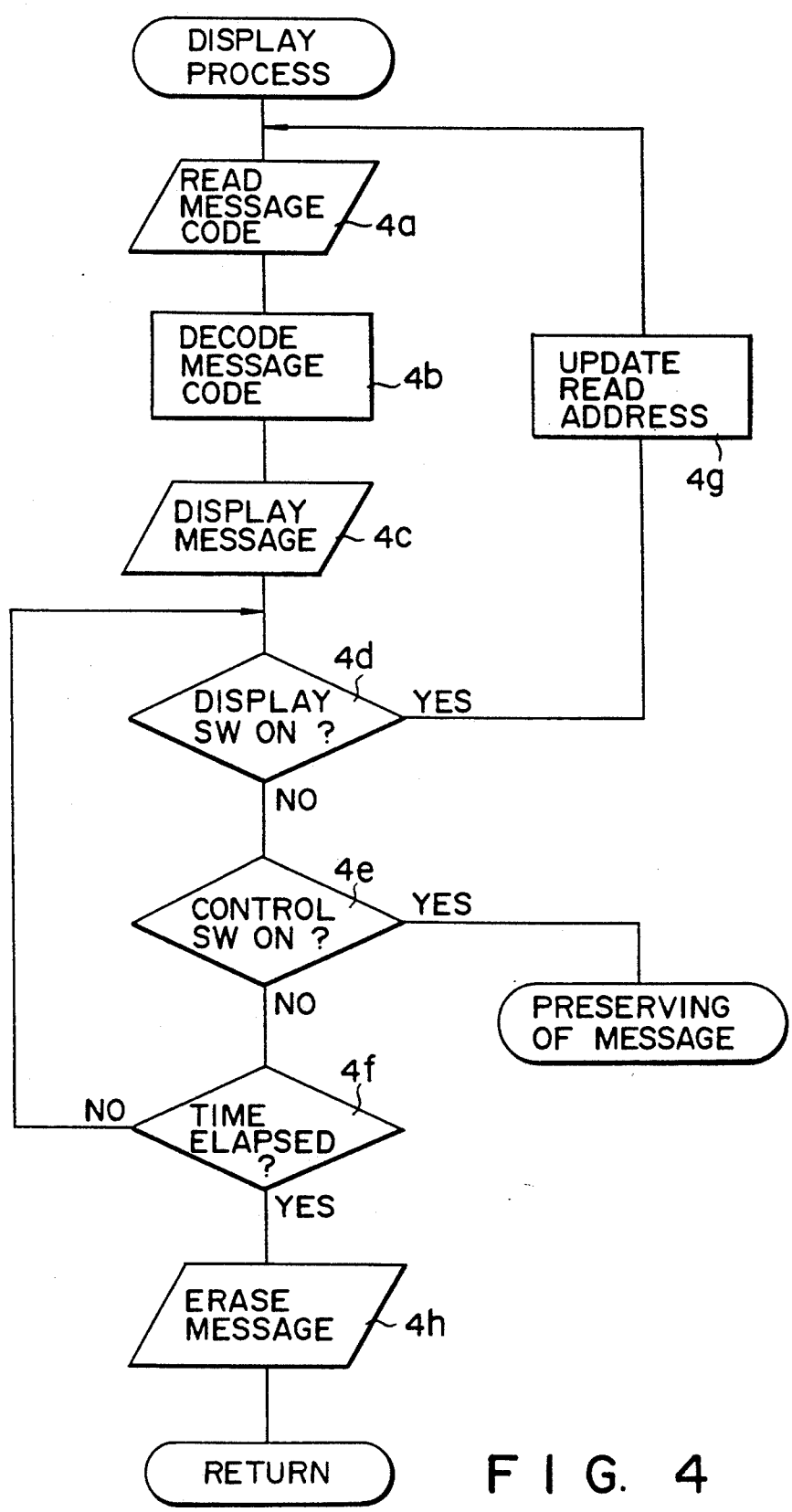

If YES in step 2b, that is, if the pager holder pushes the display switch 10 in order to see the message stored in the message memory 45, the CPU 41 detects this fact, and then starts a display process. To be more specific, as is shown in FIG. 4, the CPU 41 reads the message code from the initial address of the message memory 45 in step 4a. Then, in step 4b, the CPU 41 decodes the message code into message data. In step 4c, the message data is supplied to the LCD driver 8, and the LCD driver 8 drives the LCD 9 in accordance with the message data. As a result of this, the LCD 9 displays the message. The CPU 41 repeats steps 4d, 4e, and 4f. In step 4d, it determines whether or not the display switch 10 has been pushed; in step 4e, it determines whether or not the control switch 11 has been pushed; and in step 4f, it determines whether or not the LCD 9 has been displaying the message longer than a predetermined time t2 (e.g., 20 seconds).

If YES in step 4d, that is, if the display switch 10 has been depressed, the operation in the control circuit 4 goes to step 4g, in which the read address of the message memory 45 is updated. Then, the flow returns to step 4a. In step 4a, the CPU 41 reads the message code from the address of the message memory 45, which is next to the initial address. In step 4b, it decodes the message code into message data. In step 4c, the LCD 9 displays the message represented by the message data.

Every time the display switch 10 is pushed, the CPU 41 reads a different message code from the message memory 45, and the LCD 9 displays the message represented by this code. In other words, as the pager holder repeatedly pushes the display switch 10, the messages are sequentially read from the message memory 45 and are sequentially displayed by the LCD 9.

Figure 5:
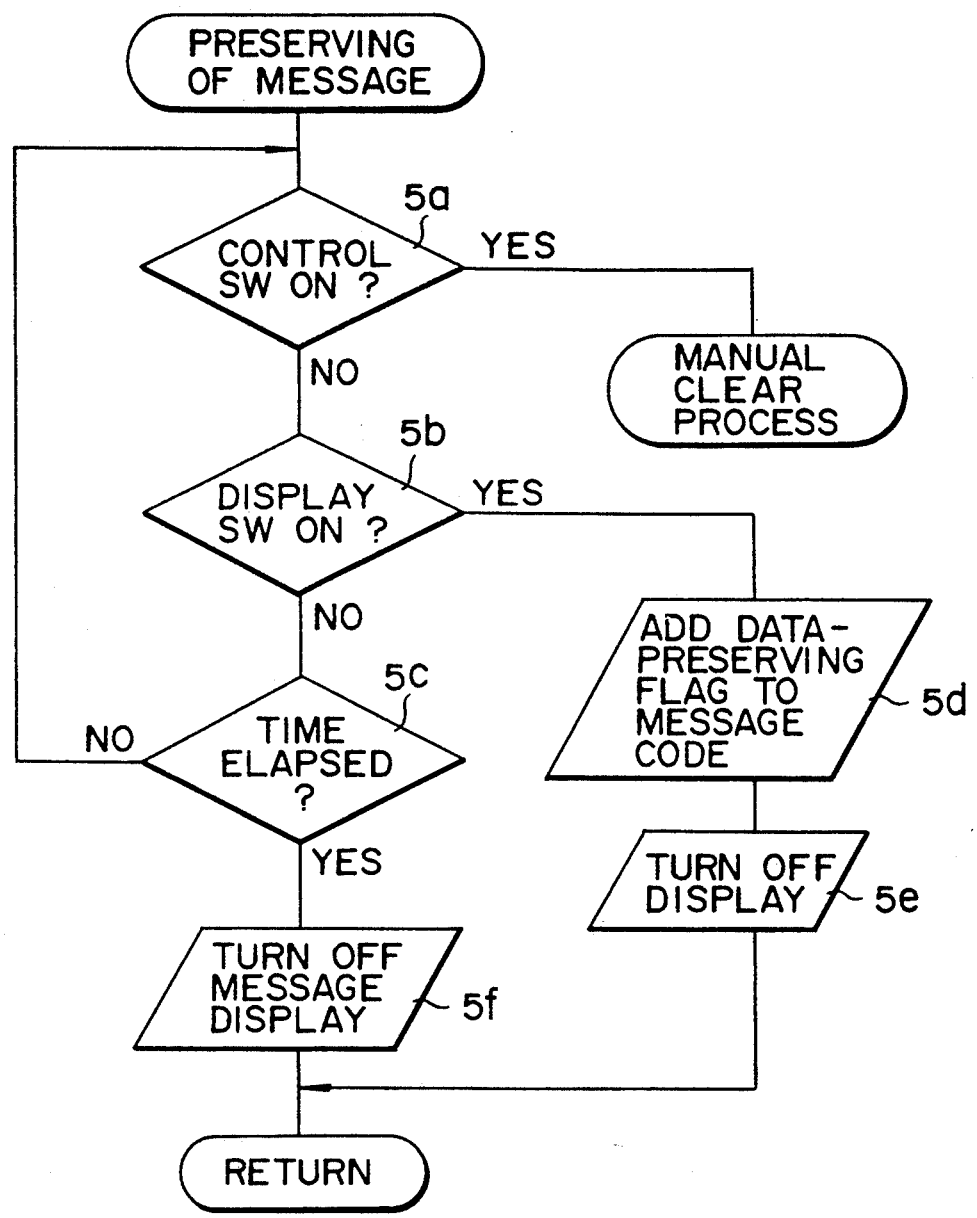

If YES in step 4e, that is, if the control switch 11 is pushed while the LCD 9 is displaying a message, the CPU 41 functions to preserve the message being displayed. More specifically, as is shown in FIG. 5, the CPU 41 repeats steps 5a, 5b, and 5c. In step 5a, it determines whether or not the control switch 11 has been pushed for the second time; in step 5b, it determines whether or not the display switch 10 has been pushed; in step 5c, it determines whether or not the LCD 9 has been displaying the message longer than a determined time t2. If YES in step 5b, that is, if the pager holder has pushed the display switch 10, the operation goes to step 5d, in which the CPU 41 adds a data-preserving flag to the message code stored in the message memory 45 and corresponding to the message which is being displayed by the LCD 9. Then, in step 5e, the CPU 41 controls the LCD driver 8 such that the LCD 9 stops displaying the message. Thus, the pager holder can preserve any received message code in the message memory 45, by pushing the display switch 10, thereby displaying the desired message, then depressing the control switch 11, thus selecting a data-preserving mode, and finally pushing the display switch 10 for the second time.

Figure 6:
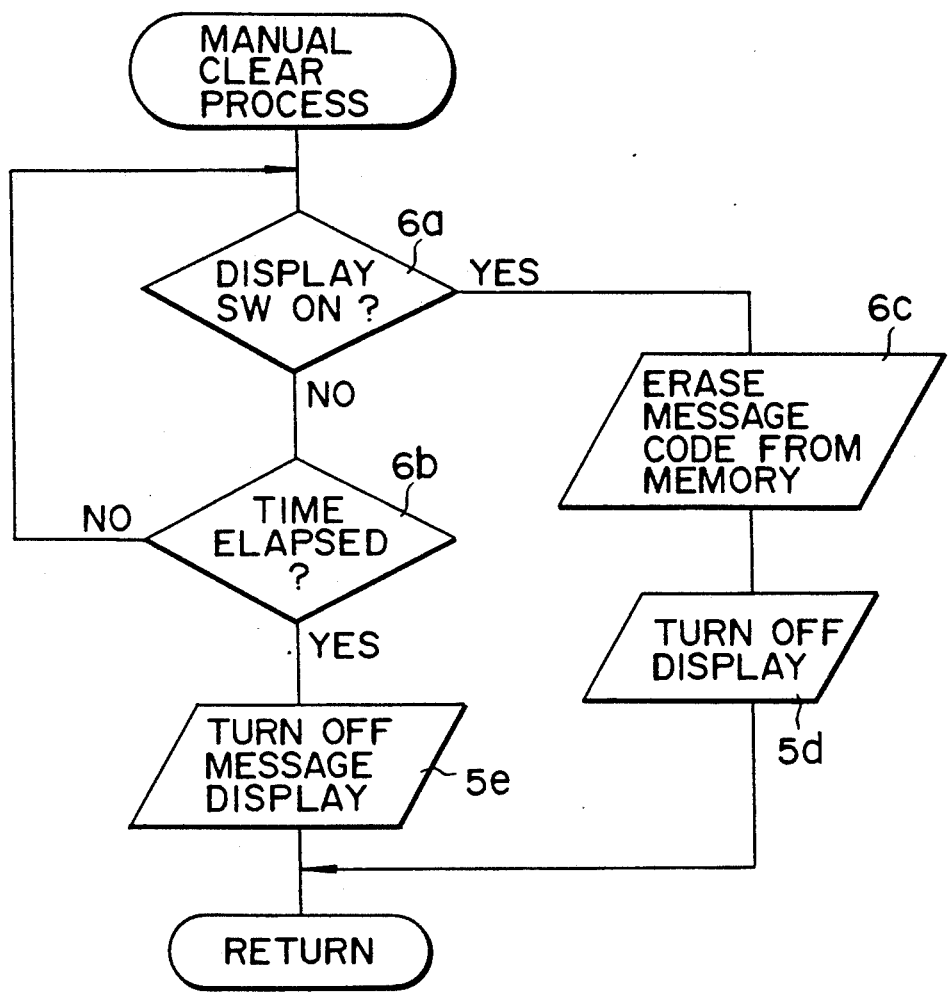

If YES in step 5a, that is, if the pager holder has depressed the control switch 11 twice continuously, the CPU 41 performs a manual clear process. More precisely, as is shown in FIG. 6, the CPU 41 repeats steps 6a and 6b. In step 6a, it determines whether or not the display switch 10 has been pushed; in step 6b, it determines whether or not the LCD 9 has been displaying the message longer than the determined time t2. If YES in step 6a, that is, if the switch 10 has been pushed, the flow goes to step 6c, in which the CPU 41 erases the message code stored in the message memory 45 and corresponding to the message which is being displayed. In step 6d, the CPU 41 controls the LCD driver 8 such that the LCD 9 stops displaying the message. Then, the operation returns to the step of receiving message codes.

Thus, the pager holder can erase any received message code from the message memory 45, by pushing the display switch 10, thereby displaying the desired message, then depressing the control switch 11 twice continuously, thus selecting a manual clear mode, and finally pushing the display switch 10 for the second time.

In both the data-preserving mode and the manual clear mode, the LCD 9 automatically stops displaying the message upon lapse of the predetermined time t2 (e.g., 20 seconds). Hence, the pager holder needs to do nothing to stop the LCD display 9.

Figure 7A:
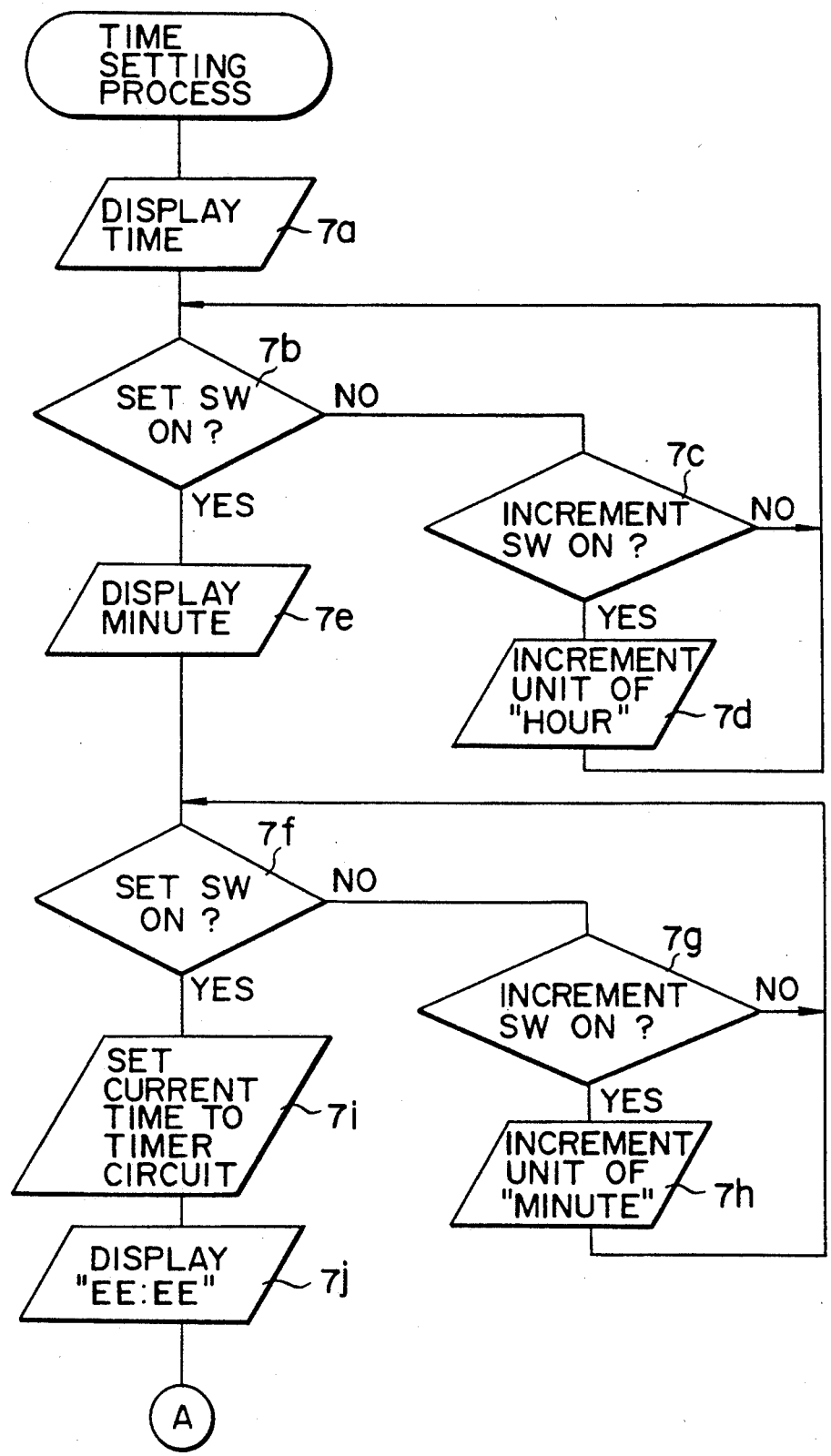
Figure 7B:
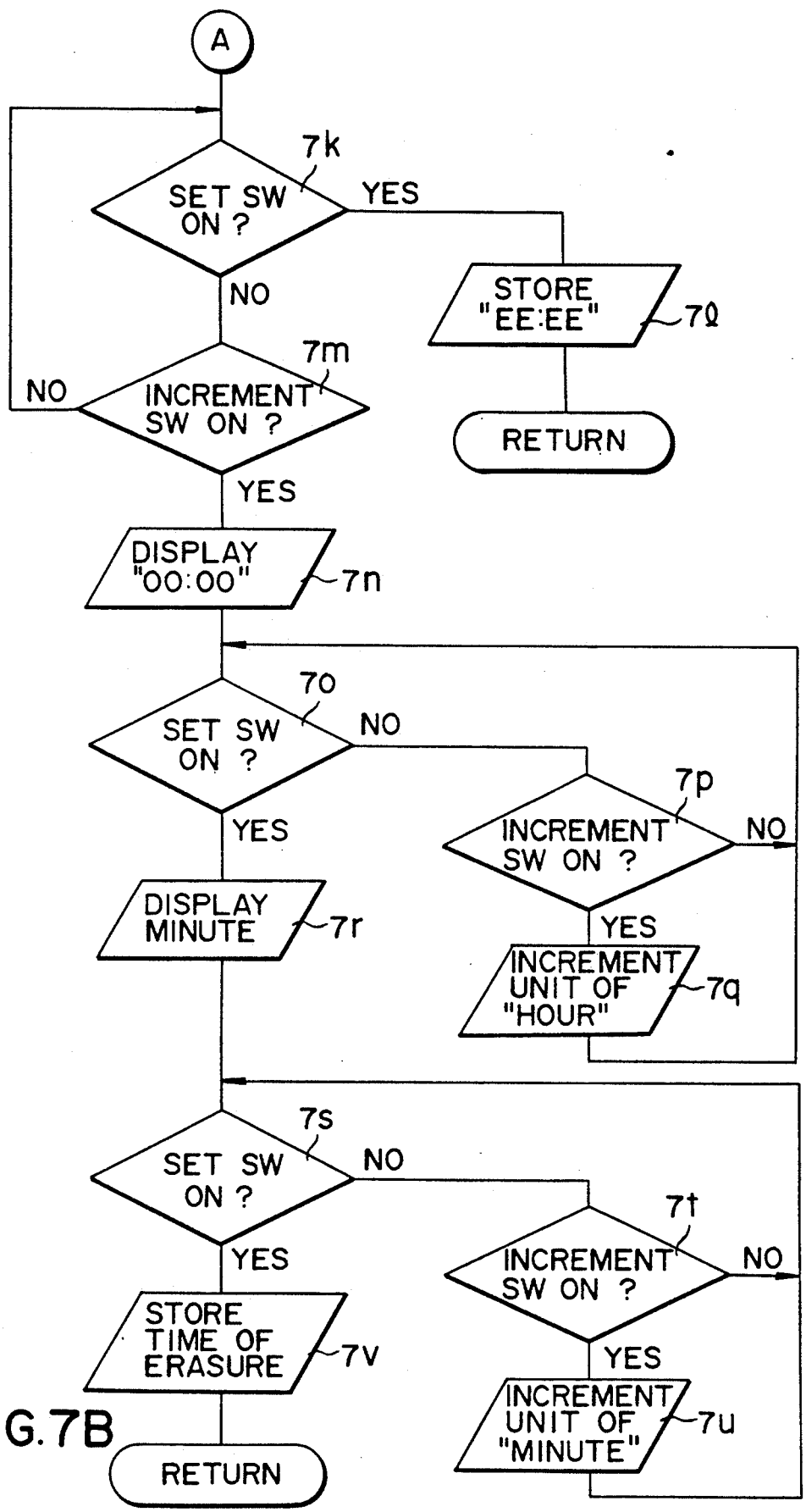

If YES in step 2c, that is, if the pager holder depresses the time-setting switch 12, the CPU 41 performs time-setting process, thereby to set the first timer 46 the current time or to set a desired message-erasing time as will be explained with reference to FIG. 7B.

It will be described how the current time is set to the first timer 46, with reference to FIG. 7A. In step 7a, the CPU 41 controls the LCD driver 8 such that the LCD 9 displays the hour of the time which the timer 46 keeps. In step 7b, it determines whether or not the time-setting switch 12 has been pushed. If NO, the flow goes to step 7c, in which the CPU 41 determines whether or not the increment switch 13 has been pushed. If NO in step 7c, the flow returns to step 7b. If YES in step 7c, the flow goes to step 7d, in which the pager holder repeatedly pushes the increment switch 13, thus incrementing the value of "hour" by one each time, until the value of "hour" reaches the correct value. Then, the flow returns to step 7b, in which the CPU 41 determines whether or not the time-setting switch 12 has been depressed.

Now that the value of "hour" has been incremented to the correct value, the pager holder depresses the time-setting switch 12, whereby the value of "hour" is stored into the memory (not shown) incorporated in the CPU 41. Hence, YES in step 7b. Then, the flow goes to step 7e, in which the CPU 41 controls the LCD driver 8 such that the LCD 9 displays the minute of the time which the timer 46 keeps. In the next step 7f, the CPU 41 determines whether or not the time-setting switch 12 has been pushed. If NO, the flow goes to step 7g, in which the CPU 41 determines whether or not the increment switch 13 has been pushed. If NO in step 7g, the flow returns to step 7f. If YES in step 7g, the flow goes to step 7h, in which the pager holder repeatedly pushes the increment switch 13, thus incrementing the value of "minute" by one each time, until the value of "minute" reaches the correct value. Then, the flow returns to step 7f, in which the CPU 41 determines whether or not the time-setting switch 12 has been depressed.

Now that the value of "minute" has been incremented to the correct value, the pager holder depresses the time-setting switch 12, whereby the value of "minute" is stored into the memory incorporated in the CPU 41. Hence, YES in step 7f. Then, the flow goes to step 7i, in which the time data representing the current time is supplied from the CPU 41 to the first timer 46.

In other words, the pager holder can set the correct time to the first timer 46 in the following way. First, he or she repeatedly pushes the increment switch 13 until the value of "hour" is corrected. Next, he or she pushes the time-setting switch 12, thus storing the corrected value of "hour" into the internal memory of the CPU 41. Then, he or she repeatedly depresses the increment switch 13 until the value of "minute" is corrected. Next, he or she depresses the time-setting switch 12, thereby storing the corrected value of "minute" into the internal memory of the CPU 41. Finally, in step 7i, the current time is set to the first timer 64.

After the current time has been set to the first timer 46, the CPU 41 operates to set the time at which to erase the message code stored in the E-RAM 45, as will be explained with reference to FIGS. 7A and 7B.

First, in step 7i, the CPU 41 controls the LCD driver 8 such that the LCD 9 displays "EE:EE." Next, in step 7k, it determines whether or not the time-setting switch 12 has been pushed. If NO, that is, if the time-setting switch 12 has not been depressed, the flow goes to step 7m. In step 7m, the CPU 41 determines whether or not the increment switch 13 has been depressed. If NO in step 7m, that is, if the pager holder has not pushed the increment switch 13, the flow returns to step 7k. If YES in step 7m, that is, if the pager holder has depressed the switch 13 to set a time of erasing the message code in the message memory 45, the operation goes to step 7n, in which the CPU 41 causes the LCD 9 to display the initial time "00:00." Then, in step 7o, the CPU 41 determines whether or not the time-setting switch 12 has been pushed. If NO, the flow goes to step 7p, in which the CPU 41 determines whether or not the increment switch 13 has been pushed. If YES in step 7p, that is, if the pager holder depresses the switch 13, the CPU 41 increments, by one, the value of "hour" of the time displayed by the LCD 9. The pager holder repeatedly pushes the increment switch 13 until the value of "hour" increases to the desired value. This desired "hour" value is displayed by the LCD 9. Seeing the value, the pager holder pushes the time-setting switch 12, whereby the desired "hour" value is stored into the internal memory of the CPU 41.

Now that the pager holder has depressed the time-setting switch 12, the decision the CPU 41 made in step 7o is YES. Then, in step 7r, the CPU 41 causes the LCD 9 to display "00", i.e., the initial "minute" value. In the next step, i.e., step 7s, the CPU 41 determines whether or not the time-setting switch 13 has been depressed. If YES in step 7s, that is, if the pager holder has pushed the switch 13 to set a desired "minute" value of the time at which to erase the message code stored the message memory 45, the operation goes to step 7t. In step 7t, the CPU 41 determines whether or not the increment switch 13 has been pushed. If NO, the flow returns to step 7s. If YES in step 7t, that is, if the pager holder depresses the switch 13, the CPU 41 increments, by one, the value of "minute" of the time displayed by the LCD 9. The pager holder repeatedly pushes the increment switch 13 in step 7u, until the value of "minute" increases to the desired value This desired "minute" value is displayed by the LCD 9. Seeing the value, the pager holder pushes the time-setting switch 12, whereby the desired "minute" value is stored into the internal memory of the CPU 41. Hence, the data showing the time of erasing the message code in the message memory 45 is stored in the CPU 41.

Now that the pager holder has depressed the time-setting switch 12, the decision the CPU 41 made in step 7s is YES. Hence, the flow goes to step 7v, in which the time data is stored from the CPU 41 into the first timer 46. The time data stored in the first timer 46 is, for example, "00:00."

When the desired time of erasing the message code is set as described above, the operation returns to the step of receiving message codes.

If the pager holder need not set a time at which to erase the message code stored in the message memory 45, he or she pushes the time-setting switch 12 while the LCD 9 is displaying "EE:EE." In this case, the decision the CPU 41 makes in step 7k is YES, and the flow goes to step 7l. In step 7, the data representing "EE:EE," which is not time data, is stored into the internal memory of the CPU 41.

If NO in step 2c (FIG. 2), that is, if the pager holder does not depress the time-setting switch 12, the CPU 41 performs automatic clear process, thereby to erase the message stored in the message memory 45 when the preset message-erasing time is reached, as will be explained with reference to the flow chart shown in FIG. 8.

Figure 8:
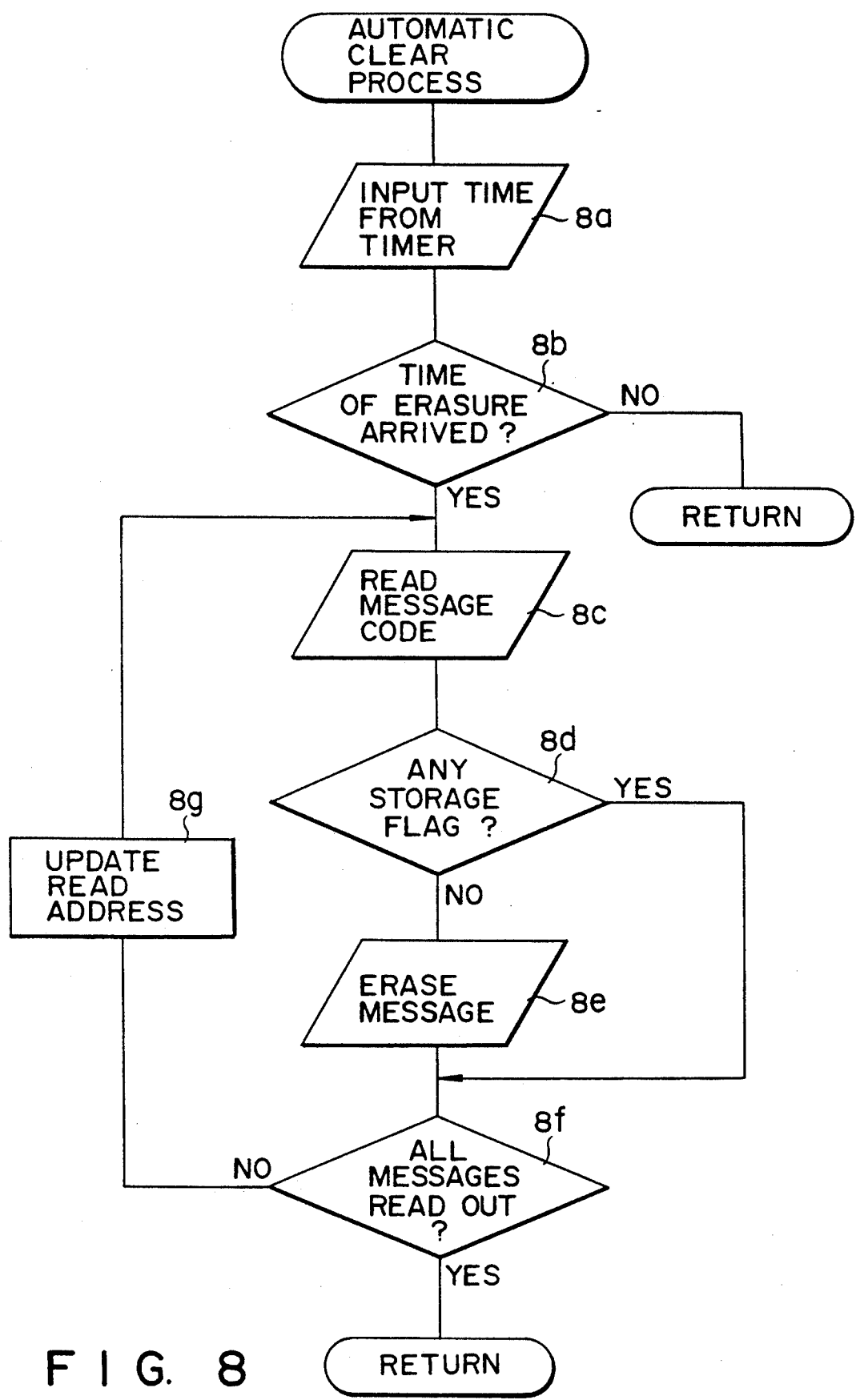

As is shown in FIG. 8, the CPU 41 reads the present-time data from the first timer 46 in step 8a. In step 8b, the CPU 41 compares the present-time data with the message-erasing time stored in the internal memory, thereby determining whether or not the message-erasing time has been reached. If NO, the flow returns to the step of receiving message codes. If YES, the flow goes to step 8c, in which the CPU 41 reads the first message code from the message memory 45, one by one. Next, in step 8d, the CPU 41 determines whether or not the message code read first from the message memory 45 contains a data-preserving flag. If NO in step 8d, the operation goes to step 8e, in which the CPU 41 erases the message code from the message memory 45. Then, the flow goes to step 8f. If YES in step 8d, that is, the first message code contains a data-preserving flag, the flow jumps to step 8f. In step 8f, the CPU 41 determines whether or not all message codes have been read from the message memory 45. If NO, the flow goes to step 8g, in which the read address is updated. Then, steps 8c, 8d, 8e, 8f, and 8g are repeated until all message codes have been read from the message memory 45. If YES in step 8f, that is, if all message codes have been read from the message memory 45, the operation returns to the step of receiving message codes.

Hence, in the case where the pager holder has preset the message-erasing time of "00:00," all message codes stored in the message memory 45, except for those containing a data-preserving flag, are automatically erased at the preset message-erasing time of "00:00." In other words, the message codes containing no data-preserving flags, which the pager holder regards as unnecessary, are automatically erased from the message memory 45 at the preset message-erasing time. It is only the message codes containing the data-preserving flags that cannot be automatically erased and are, thus, kept stored in the message memory 45. This helps the pager holder to recognize the stored messages easily.

Further, by virtue of the manual clear process, the pager holder can erase any message that should not be disclosed to anyone else, any time before the message is automatically erased from the message memory 45. The pager receiver shown in FIG. 1 is therefore advantageous in terms of information security.

As has been described, the LCD 9 displays any message which is to be erased by means of manual clear process, and also any message to which a data-preserving flag is to be added. Seeing the message thus displayed, the pager holder can recognize which message code he or she is going to erase, or which message code he or she would like to preserve in the message memory 45.

As may be understood from the above, the display switch 10, the control switch 11, the time-setting switch 12, and the increment switch 13 are pushed in various combination, thereby to add the data-preserving flag to any desired message code, to erase any message code, to set the present time, and set the time of automatically erasing any message code. Hence, four special switches need not be used for performing these four operations. This helps to miniaturize the pager receiver.

Second Embodiment

A second embodiment of the invention, which is a cordless telephone for use in a cordless telephone system. As well known a cordless telephone system comprises a fixed device and a one cordless telephone. The fixed device is connected to the exchange installed in a telephone station, by a subscriber's line. The cordless telephone is connected by a radio channel to the fixed device, in one-to-one relationship.

Figure 9:
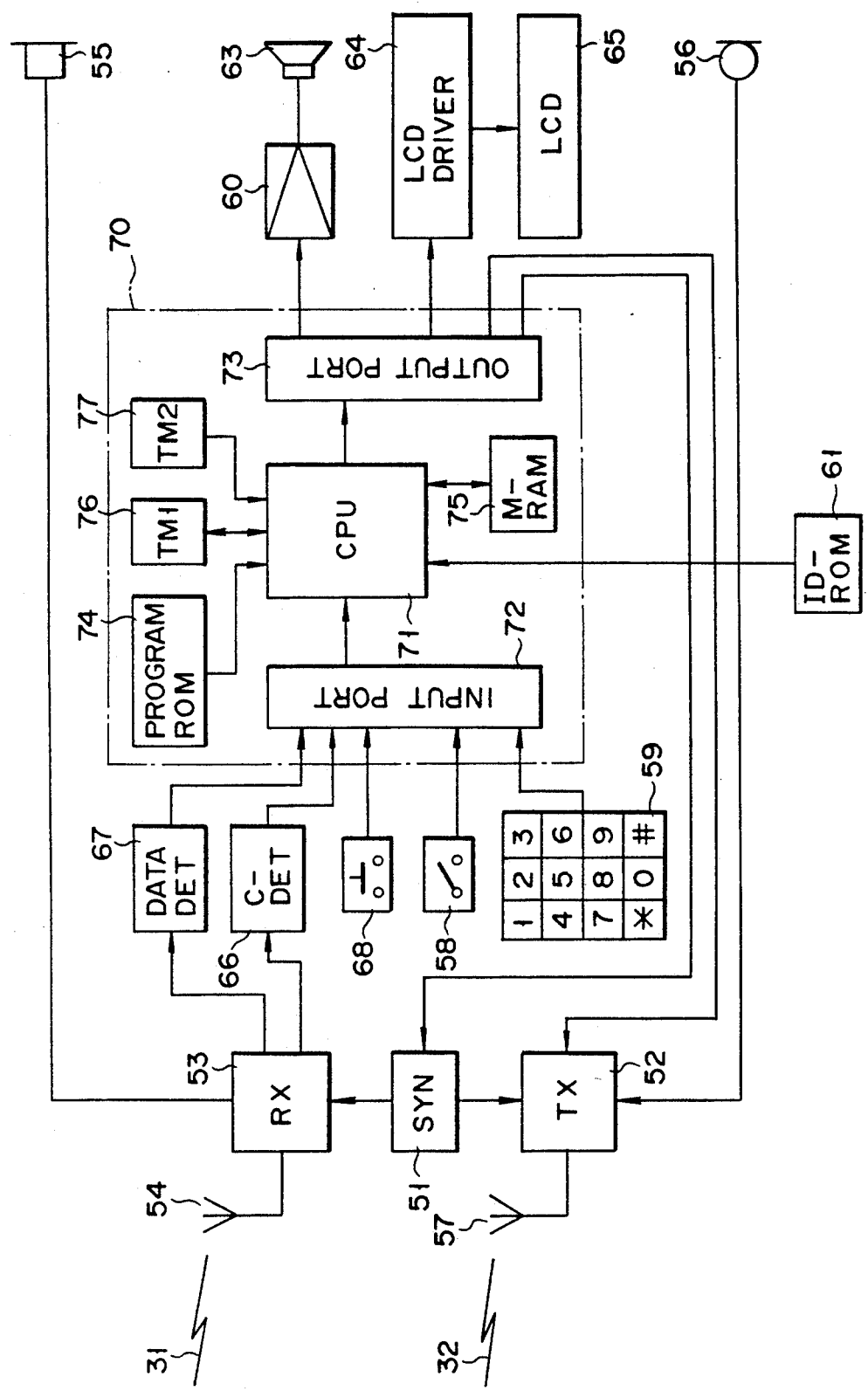
FIG. 9 is a block diagram illustrating a cordless telephone according which is a second embodiment of the invention.

FIG. 9 is a block diagram illustrating the cordless telephone according to the invention. As FIG. 9 shows, the telephone comprises a synthesizer (SYN) 51, a transmitter (TX) 52, a receiver (RX) 53, a reception antenna 54, a speaker 55, a microphone 56, and a transmission antenna 57. The transmitter 52 and the receiver 53 are connected to the synthesizer 51. The reception antenna 54 is connected to the receiver 53, whereas the transmission antenna 57 is connected to the transmitter 52. The speaker 55 is connected to the receiver 53, and the microphone 56 is connected to the transmitter 52.

The reception antenna 54 catches a radio signal transmitted from a fixed device (not shown) through a reception channel 31. The radio signal is supplied to the receiver 53, which demodulates the signal into a speech signal. The speech signal is supplied to the speaker 55 and is converted into a speech.

The microphone 56 picks up a speech made by the telephone user and converts the speech into a speech signal. The speech signal is supplied to the transmitter 52, which modulates carrier waves with the speech signal. The transmission antenna 57 transmits the modulated carrier waves to the fixed device (not shown) through a transmission channel 32.

As is illustrated in FIG. 9, the cordless telephone further comprises a control circuit 70. The control circuit 70 is, for example, a microcomputer, and has a central processing unit (CPU) 71, an input port 72, an output port 73, a program ROM 74, a message memory (message memory) 75, a first timer (TM1) 76, and a second timer (TM2) 77. The CPU 71 performs predetermined controls in accordance with the programs stored in the program ROM 74. An ID ROM 61 is connected to the CPU 71. The ID ROM 61 stores the prescribed ID code assigned to the cordless telephone The CPU 71 compares the ID code with the ID code contained in any data transmitted from the fixed device for connecting the telephone to the fixed device by means of radio channels.

The message memory 75 is a RAM. The RAM has a plurality of memory areas for storing message codes transmitted from other telephones. The first timer 76 comprises an IC of the same type for use in watches. The second timer 77 has a plurality of counters which start counting the count-start signals supplied from the CPU 71 and which output count values.

As is shown in FIG. 9, the cordless telephone further comprises a transmission switch 58, a key pad 59, an electric-field detector (C-DET) 66, a data detector (DATA DET) 67, and a display switch 68—all connected to the input port 72. The electric-field detector 66 is, for example, a carrier squelch circuit or a noise squelch circuit for detecting the radio waves coming from the fixed device. The data detector 67 is provided to detect the control data transmitted from the fixed device. The display switch 68 is a pushbutton switch and is operated to read any message code desired, from the message memory 75, so that the message corresponding to the code is displayed.

As FIG. 9 shows, the cordless telephone also has a sounder driver 60, a sounder 63, an LCD driver 64, and an LCD 65. The drivers 60 and 64 are connected to the output port 73. Also connected to the output port 73 are the synthesizer 51 and the transmitter 52. The sounder 63 and the LCD 65 are connected to the drivers 60 and 64, respectively. The sounder driver 60 drives the sounder 63 in response to a drive signal supplied from the CPU 71. Thus driven, the sounder 63 generates a ringing tone. The LCD driver 64 drives the LCD 65 in response to the display data supplied from the CPU 71, whereby the LCD 65 displays the data such as the present time, the time for which the telephone has been occupied, the telephone number input by operating the key pad 59, or the message represented by the code stored in the message memory 75.

The operation of the cordless telephone shown in FIG. 9 will now be explained.

Let us assume that a user pushes the transmission switch 58 in order to call any person to whom he or she wishes to talk over the telephone. Then, the CPU 71 sets both the receiver 52 and the transmitter 53 into continuous operation mode and, at the same time, assigns two control radio channels to the receiver 52 and the transmitter 53, respectively. Next, the CPU 71 generates control data which contains a transmission command and also the ID code stored in the ID ROM 61. The transmitter 52 transmits this control data to the fixed device through the transmission antenna 57.

In the fixed device, the ID code contained in the data is compared with the ID code stored in the ID-ROM incorporated in the fixed device. If the compared ID codes are identical, the control radio channel connecting the cordless telephone and the fixed device is switched to a speech radio channel. The fixed device generates control data containing a transmission/reception command and data for assigning a speech radio channel to the cordless telephone. This control data is transmitted from the fixed device to the cordless telephone through the speech radio channel. At the same time, a line switch incorporated in the fixed device is turned on, thereby closing the DC loop of the subscriber's line. As a result, a dialing tone arrives from the exchange. This tone is transmitted to the cordless telephone via the speech radio channel.

In the cordless telephone, the CPU 71 designates radio channels for the transmitter 52 and the receiver 53 in accordance with the data contained in the control data transmitted from the fixed device. The receiver 53 receives the dialing tone transmitted to and/or from the fixed device through the speech radio channel, and supplies this tone to the speaker 55. The speaker 55 generates a dialing tone. In this condition, the user of the cordless telephone operates the key pad 59, thus inputting the telephone number of the person whom he or she wishes to talk. Then, the transmitter 52 transmits the data representing the telephone number to the fixed device.

In the fixed device, line switches are operated in accordance with the data, generating dialing pulses. The dialing pulses are transmitted from the fixed device to the exchange through the subscriber's line. The exchange operates in accordance with the dialing pulses, and supplying a calling signal to the telephone of the person called. When this person takes the receiver off the cradle, his or her telephone is connected to the cordless telephone. Thus, the user of the cordless telephone and the person called can talk over the telephone.

Let us assume that a ringing signal is supplied from the exchange to the fixed device through the subscriber's line. The fixed device assigns the control radio channel to the transmitter 52 and the receiver 5 of the cordless telephone, respectively. Then, the fixed device generates control data containing an ID code and a command. This command shows that a ringing signal has arrived at the fixed device. The control data is transmitted from the fixed device to the cordless telephone through the control radio channel assigned to the receiver 53.

In the meantime, the receiver 53 is turned on intermittently, so as to save power. More specifically, the receiver 53 is repeatedly on, each time for one second, and is repeatedly off, each time for several seconds. The electric-field detector 66 detects any radio waves transmitted from the fixed device and received by the receiver 53, and output signals. Upon receipt of these signals, the CPU 71 sets the receiver 53 into continuous reception mode. Hence, the receiver 53 receives the control data transmitted from the fixed device. The control data is supplied to the data detector 67. The detector 67 detects the ID code and the command, both contained in the control data, and supplies the ID code and the command to the CPU 71.

The CPU 71 compares the ID code with the self-ID codes stored in the ID-ROM 61. If the ID code compared are identical, the CPU 71 operates in the following manner in order to connect the transmitter 52 and receiver 54 with the fixed device by speech radio channel.

First, the CPU 71 supplies the synthesizer 51 with the data for designating a speech radio channel. In accordance with this data, the synthesizer 51 outputs carrier waves having the frequency assigned to the speech radio channel. These carrier waves are supplied to the transmitter 52 and the receiver 53. As a result, the transmitter 52 can transmit signals to the fixed device, and the receiver 53 can receive signals from the fixed device. Further, the CPU 71 supplies a drive signal to the sounder driver 62. The driver 62 drives the sounder 63 in accordance with the drive signal, whereby the sounder 63 generates a ringing tone. Hearing this tone, the user of the cordless telephone knows that he or she is being called.

Assuming that the user pushes the transmission switch 58, the CPU 71 generates control data containing a response command. The transmitter 52 transmits the c control data to the fixed device. In the fixed device, the line switch is turned on, thereby closing the DC loop of the subscriber's line. As a result, the fixed device is connected to the exchange, connecting the cordless telephone to the telephone of the caller. Hence, the caller and the user of the cordless telephone can talk over the telephone.

Let us assume that the cordless telephone is set in so-called "user-absence mode." When control data containing a call command and an ID code is transmitted to the cordless telephone from the fixed device, the CPU 71 compares the ID code with the ID code stored in the ID-ROM 61. If the ID codes compared are identical, the cordless telephone is connected to the fixed device by speech radio channels. Then, the CPU 71 generates control data which contains a response command, despite that the transmission switch 58 has not been depressed. The transmitter 52 transmits this control data to the fixed device.

In the fixed device, the line switch is turned on upon receipt of the control data transmitted from the cordless telephone, thus closing the DC loop of the subscriber's line. The fixed device is therefore connected to the exchange, whereby the cordless telephone is connected to the telephone of the caller.

If the caller's telephone transmits a DTMF signal (i.e., message code such as the caller's telephone number) to the exchange, the DTMF signal is further transmitted to the fixed device. The fixed device transmits the DTMF signal to the cordless telephone. In the cordless telephone, the receiver 53 receives the DTMF signal, and the data detector 67 detects the message code represented by the DTMF signal. The CPU 71 determines whether or not any memory area of the message memory 75 is empty. If YES, the message code is stored in the empty memory area. If NO, the message code stored in the memory 75 longer than any other message code, is erased, making the memory area empty, and the message received is stored in this memory area.

When the user of the cordless telephone comes home and then pushes the display switch 68 in order to read the message code stored in the message memory 75, the CPU 71 starts controlling the message code, as will be described below.

First, the CPU 71 designates the address of that memory area of the message memory 75 in which the latest message code received is stored. Then, the CPU 71 reads the message code from the memory area designated. The message code is decoded into message data. The message data is supplied to the LCD driver 64. The LCD driver 64 drives the LCD 65 in accordance with the message data, whereby the LCD 65 displays the message corresponding to the message code. Then, the CPU 71 determines whether or not the display switch 68 and the control keys (e.g., the "#" key) of the key pad 59 have been depressed. It also determines whether or not the message has been displayed longer than a predetermined time t2 (e.g., 20 seconds). If the user of the cordless telephone pushes the display switch 68, the CPU 71 updates the read address of the message memory 75, and reads the message code from that memory area of the memory 75 which corresponds to the updated read address. The message code is decoded into message data, which is supplied to the LCD driver 64. The LCD driver 64 drives the LCD 65 in accordance with the message data, whereby the LCD 65 displays the message corresponding to the message code.

Thereafter, as the user pushes the display switch 68 repeatedly, the different message codes are sequentially read from the other memory areas of the message memory 75. Hence, the LCD 65 sequentially displays the messages corresponding to these codes. The user of the cordless telephone can, therefore, confirm the received messages, one after another, by repeatedly depressing the display key 68.

Let us assume that the user pushes the control key (i.e., the "#" key) one time while the LCD 65 is displaying a message. Then, the CPU 71 sets, in the following way, a time during which to preserve the corresponding message code in the message memory 75.

More specifically, the CPU 71 determines whether or not the set key (i.e., the "*" key) or the increment key (i.e., the "0" key) have been depressed. When the user of the cordless telephone pushes the set key or the increment key, the CPU 71 controls the LCD driver 64 such that the LCD 65 displays "00:00." Then, the user pushes the increment key repeatedly until the value of "hour" displayed changes to a desired value. Confirming that the "hour" value displayed is the desired one, the user pushes the set key, whereby the desired "hour" value is stored into the memory incorporated in the CPU 71. Next, the user pushes the increment key repeatedly until the value of "minute" displayed changes to a desired value. Confirming that the "minute" value displayed is the desired one, the user pushes the set key, whereby the desired "minute" value is stored into the internal memory of the CPU 71. As a result, the time during which to preserve the desired message code in the message memory 75 is set in the internal memory of the CPU 71. The code-preserving time is, for example, 24 hours.

As may be understood from the preceding paragraph, the user can set the time for preserving any desired message code, by displaying the message corresponding to the code, depressing the control key one time while the message is being displayed, repeatedly pushing the increment key to select an "hour" value, depressing the set key to store the selected "hour" value into the internal memory, repeatedly pushing the increment key to select a "minute" value, and pushing the set key to store the selected "minute" value into the internal memory. In order to preserve a desired message code for a period longer than 24 hours, it is sufficient for the user to set "00" for the "hour" value.

In order to erase any message code stored in the message memory 75, it is sufficient for the user to push the control key (i.e., the "#" key) twice while the corresponding message is being displayed by the LCD 65. More specifically, the user pushes the display switch 68 repeatedly until the LCD 65 displays the message corresponding to the message code which is to be erased. Then, the user depresses the control key (i.e., the "#" key) twice, and further pushes the display key 68. The CPU 71 determines that the display key 68 has been pushed, and erase the message code from the message memory 75.

The user of the cordless telephone can set the correct time to the first timer 76 in the following way.

First, he or she depresses the set key (i.e., the "*" key). The CPU 71 determines that the set key has just been depressed, and reads the time data from the first timer 76 and supplies this data to the LCD driver 64 via the output port 73. The LCD driver 64 drives the LCD 75 in accordance with the time data, whereby the LCD 65 displays the "hour" value of the time. Then, the CPU 71 determines whether the increment key (i.e., the "0" key) has been pushed. If YES, the CPU 71 increments the "hour" value of the displayed time by one. If NO, the CPU 71 again determines whether or not the increment key has been pushed. Hence, as the user repeatedly pushes the increment key, the "hour" value display increases. When the user gets the "hour" value changed to the correct value, he or she pushes the set key. Then, the CPU 71 stores the correct "hour" value into the internal memory.

Thereafter, the CPU 71 controls the LCD driver 64 such that the LCD 65 displays the "minute" value of the time. The CPU 71 determines whether the increment key has been pushed. If YES, the CPU 71 increments the "minute" value of the displayed time by one. If NO, the CPU 71 again determines whether or not the increment key has been pushed. Hence, as the user repeatedly pushes the increment key, the "minute" value display increases. When the user gets the "minute" value changed to the correct value, he or she pushes the set key. Then, the CPU 71 stores the correct "minute" value into the internal memory. The "hour" value and the "minute" value, both stored in the internal memory are set to the first timer 76, whereby the correct time is set to the timer 76.

In other words, the user of the cordless telephone can set the correct time to the first timer 76 by pushing the increment key repeatedly to change the "hour" value to the correct one, then depressing the set key to set the correct "hour" value, further pushing the increment key repeatedly to change the "minute" value to the correct one, and finally depressing the set key to set the correct "minute" value.

The CPU 71 can automatically erase any message code received and stored in the message memory 75, in the following way.

When a message code transmitted from the fixed device is stored into the message memory 75, the CPU 71 supplies a count-start signal to one of the counters which constitute the second timer 77. Upon receipt of the count-start signal, the counter starts measuring time. The CPU 71 periodically compares the count of the counter with the message-preserving time stored in the internal memory. If the count is identical to the message-preserving time, the CPU 71 determines that the message-preserving time has expired, and thus erases the message code from the message memory 75. To be more specific, if the message-preserving time set stored in the internal memory of the CPU 71 is 12 hours, the message code is automatically erased upon lapse of 12 hours from the receipt of the message code. The same holds true of any other message code stored in the message memory 75. If a preserving time of "00" hours is stored in the internal memory for a message code, this message code is never erased from the message memory 75.

As can be understood from the above, any message code stored in the message memory 75 can be automatically erased upon lapse of a predetermined time, provided that predetermined time is preset in the internal memory of the CPU 71. Hence, message code which are not so important can be automatically erased upon lapse of relatively short periods of time. This helps the pager holder to recognize the stored messages easily. Since any desired preserving time can be set for each message code, a message code which the user regards as very important can be kept stored in the message memory 75 as long as the user wishes.

Further, since the user of the cordless telephone can erase the code of any message that should not be disclosed to anyone else, any time before the message is automatically erased from the message memory 75, the cordless telephone in FIG. 9 is advantageous in terms of information security.

The present invention is not limited to the embodiments described above. For instance, a specific message-erasing times can be set for each message code stored in the message memory 45, instead of setting the same message-erasing time for all message codes stored in the message memory 45. If this is the case, the message codes will be erased upon lapse of different periods.

Further, when the user operates the switches to erase any message code stored, the CPU may determine whether or not a data-preserving flag has been added to this message code, so that the message code can be erased only if no data-preserving flag is added to it.

In the first embodiment, each message code can be erased from the message memory 45 only if it has no data-preserving flag. Instead, a data-erasing flag may be added to any message code which need not be preserved, whereby message codes having no data-erasing flag are kept stored in the message memory 45. This method is advantageous in the case where more message codes should be preserved than those which can be erased.

Further, a message-erasing time can be set in terms of not only in hours and minutes, but also in terms of day or day of the week, in which case a message code can be automatically erased upon lapse of about one month or about one week.

Moreover, the present invention can be applied not only to a pager receiver or a cordless telephone, but also to any other radio communication devices such as a car telephone and a mobile telephone.

Still further, the method of storing message codes into the message memory, the method of reading the message codes therefrom, the type and structure of the display used, and the type and structure of the display switch, and the like can be modified in every possible way, without departing the scope of the present invention.

Additional advantages and modifications will readily occur to those skilled in the art. Therefore, the invention in its broader aspects is not limited to the specific details, representative devices, and illustrated examples shown and described herein. Accordingly, various modifications may be without departing from the spirit or scope of the general inventive concept as defined by the appended claims and their equivalents.

What is claimed is:

1. A radio telecommunication apparatus comprising:
   signal-receiving means for receiving a signal containing a message, for demodulating the signal, and for outputting the demodulated signal;
   memory means, connected to said signal receiving means, having a storage area for storing at least one message contained in the demodulated signal output by said signal-receiving means;
   timer means for measuring time and outputting time data;
   first input means for inputting and holding message-erasing time data representing a timing of erasing the message stored in said memory means; and
   first message-erasing means, connected to said timer means, said first input means, and said memory means, for erasing a message stored in the memory means, said first message-erasing means comparing the time data output by the timer means and the message-erasing time data input by the first input means with each other, and erasing the message stored in the memory means if a coincidence is detected between the time data and the message-erasing time data.

2. The radio telecommunication apparatus according to claim 1, further comprising:
   second input means for inputting, in response to a manual operation, a command for erasing at least one message stored in said memory means; and
   second message-erasing means, connected to said second input means and said memory means, for erasing the message stored in said memory means, in accordance with the command input by operating said second input means.

3. The radio telecommunication apparatus according to claim 1, wherein said first input means sets and holds data representing the time of erasing the message, and said first message-erasing means erases the message stored in said memory means when the time data output by said timer means is identical to the time of erasing the message.

4. The radio telecommunication apparatus according to claim 1, wherein said first input means sets and holds data representing a time period for which the message is to be stored in said memory means, and said first message-erasing means erases the message stored in said memory means when the time period elapses.

5. A method of erasing messages in a radio telecommunication apparatus comprising memory means having a storage area for storing at least one message received, and timer means for measuring time and outputting time data, said method comprising the steps of:
   setting and holding message-erase time data representing a timing of erasing the message stored in said memory means; and
   comparing the time data output by the timer means and the message-erasing time data input by a first input means with each other;
   erasing a message stored in the memory means if a coincidence is detected between the time data and the message-erasing time data.

6. A radio telecommunication apparatus comprising:
   signal-receiving means for receiving a signal containing a message, for demodulating the signal, and for outputting the demodulated signal;
   memory means, connected to said signal receiving means having a storage area for storing a plurality of messages each contained in the demodulated signal output by said signal-receiving means;
   timer means for measuring time and outputting time data;
   input means for inputting and holding message-erasing time data in association with the respective messages stored in said memory means; and
   message-erasing means, connected to said timer means, said input means and said memory means, for selectively erasing the messages stored in the memory means, said message-erasing means comparing the time data output by the timer means and the message-erasing time data input by the input means with each other, detecting whether or not the time data coincides with one of the message-erasing time data, and selecting and erasing that one of the messages stored in the memory means which corresponds to the message-erasing time data detected as coinciding with the time data.

7. The radio telecommunication apparatus according to claim 6, further comprising:
   display means, connected to said memory means, for displaying the messages stored in said memory means; and
   display control means, connected to said input means, said memory means, and said display means, for reading the messages from said memory means and causing said display means to display the messages, before said input means is operated to input and hold the message-erasing time data.

8. A radio telecommunicating apparatus comprising:
   signal-receiving means for receiving a signal containing a message, for demodulating the signal, and for outputting the demodulated signal;
   memory means, connected to said signal-receiving means, having a storage area for storing a plurality of messages each contained in the demodulated signal output by said signal-receiving means;
   timer means for measuring time and outputting time data;
   first input means for inputting and holding message-erasing time data representing a timing of erasing the messages stored in said memory means;
   second input means for inputting and holding message protection data representing which one of the messages stored in the memory means is designated as a protection object; and message-erasing means, connected to said timer means, said memory means, said first input means, and said second input means, for selectively erasing the messages stored in the memory means, said message-erasing means comparing the time data output by the timer means and the message-erasing time data input by the first input means with each other, and erasing that one of the messages stored in the memory means which is not designated as said protection object if a coincidence is detected between the time data and the message-erasing time data.

9. The radio telecommunication apparatus according to claim 8, further comprising:

display means, connected to said memory means, for displaying the messages stored in said memory means; and display control means, connected to said memory means, said display means, and said second input means, for reading the messages from said memory means and causing said display means to display the messages, before said second input means is operated to input and hold message-preserving data.

10. The radio telecommunication apparatus according to claim 8, further comprising:

third input means for inputting, in response to a manual operation, a command for erasing the messages stored in said memory mean; and second message-erasing means, connected to said memory means and said third input means, for erasing the messages stored in said memory means in accordance with the command input by operating said third input means.

11. The radio telecommunication apparatus according to claim 8, further comprising:

third input means for inputting, in response to a manual operation, a command for erasing the messages stored in said memory means; and second message-erasing means, connected to said memory means, said second input means, and said third input means, for selectively erasing the messages stored in the memory means when the erasing command is input by the third input means, said second message-erasing means erasing that one of the messages stored in the memory means which is not designated as a protection object by the message protection data input by the second input means.

12. The radio telecommunication apparatus according to claim 8, wherein:

said second input means inputs and holds message protection data representing which one of the messages stored in said memory means is designated as a protection object, and said second message-erasing means erases that one of the messages stored in said memory means which is not designated as a protection object by the message protection data input by said second input means.

13. The radio telecommunication apparatus according to claim 8, further comprising a plurality of program keys which are operated in various combination for actuating said first input means and said second input means, thereby to input the message-erasing time data and message protection data.

14. The radio telecommunication apparatus according to claim 11, further comprising a plurality of program keys which are operated in various combination for actuating said first input means, said second input means, and said third input means, thereby to input the message-erasing time data, the message protection data, and the message-erasing command.

15. A pager receiver comprising:

receiver means for receiving a paging signal containing a message, demodulating the signal, and outputting the demodulated signal;

determining means, connected to said receiver means, for determining whether or not the demodulated signal output by said receiver means contains a message addressed to the pager receiver;

message memory means, connected to said determining means, for storing the message addressed to the pager receiver;

display means, connected to said message memory means, for displaying the message stored in said message memory means;

timer means for measuring time and outputting time data;

input means for inputting and holding message-erasing time data representing a timing of erasing the message stored in said message memory means; and message-erasing means, connected to said message memory means, said timer means, and said input means, for erasing a message stored in the memory means, said message-erasing means comparing the time data output by the timer means and the message-erasing time data input by the input means with each other, and erasing the message stored in the memory means if a coincidence is detected between the time data and the message-erasing time data.

16. A cordless telephone for use in a cordless telephone system comprising a fixed device connected to a communication network, said cordless telephone comprising:

receiver means for receiving a signal transmitted from said communication network and containing a message, for demodulating the signal, and for outputting the demodulated signal;

memory means, connected to said receiver means, having a storage area for storing at least one message contained in the signal output by said receiver means;

timer means for measuring time and outputting time data;

input means for inputting and holding message-erasing time data representing a timing of erasing the message stored in said memory means; and message-erasing means, connected to said memory means, said timer means, and said input means, for erasing a message stored in said memory means, said message-erasing means comparing the time data output by the timer means and the message-erasing time data input by the input means with each other, an erasing the message stored in the memory means if a coincidence is detected between the time data and the message-erasing time data.

* * * * *